US010786881B2

(12) United States Patent
Murota

(10) Patent No.: US 10,786,881 B2
(45) Date of Patent: Sep. 29, 2020

(54) SPINDLE DEVICE

(71) Applicant: FANUC CORPORATION, Yamanashi (JP)

(72) Inventor: Masahiro Murota, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/452,068

(22) Filed: Jun. 25, 2019

(65) Prior Publication Data

US 2020/0001415 A1    Jan. 2, 2020

(30) Foreign Application Priority Data

Jun. 28, 2018   (JP) ................................ 2018-122802

(51) Int. Cl.
    *B23Q 1/70*         (2006.01)
    *B23Q 5/04*         (2006.01)
    (Continued)

(52) U.S. Cl.
    CPC ............... *B23Q 1/70* (2013.01); *B23Q 5/043* (2013.01); *B23Q 5/10* (2013.01); *B23Q 11/127* (2013.01)

(58) Field of Classification Search
    CPC .... B23Q 11/0003; B23Q 11/127; B23Q 1/70; B23Q 5/043; B23Q 5/10; B23Q 2220/006;
    (Continued)

(56) References Cited

U.S. PATENT DOCUMENTS 4,611,934 A * 9/1986 Piotrowski ............. B23Q 1/265
                                           384/517
5,850,770 A * 12/1998 Rehage ................... B23Q 5/20
                                           82/142

(Continued)

FOREIGN PATENT DOCUMENTS

CN      101733417 A     6/2010
EP       1088618 A2 * 4/2001 ............... B23Q 5/10
(Continued)

OTHER PUBLICATIONS

Notice of Reasons for Refusal issued by the Japanese Patent Office in relation to Japanese Application No. 2018-122802 dated Apr. 14, 2020 (3 pages) along with English language translation (3 pages).

(Continued)

*Primary Examiner* — Sara Addisu
(74) *Attorney, Agent, or Firm* — Robert P. Michal, Esq.; Carter, DeLuca & Farrell LLP

(57) ABSTRACT

A spindle device includes: a spindle housing; a spindle shaft configured to be rotatably supported inside the spindle housing; a spindle mount having an insertion cavity into which the spindle housing is inserted along the axial direction of the spindle shaft; a flange portion projecting outward from the outer peripheral surface of the spindle housing and configured to be removably fixed to an end of the spindle mount that is closer to one opening of the insertion cavity; and a support member configured to support the spindle housing inserted in the insertion cavity by using, as a base, the other end of the spindle mount that is closer to the other opening of the insertion cavity.

9 Claims, 7 Drawing Sheets

(51) Int. Cl.
  *B23B 19/02* (2006.01)
  *B23Q 5/10* (2006.01)
  *B23Q 11/12* (2006.01)

(58) Field of Classification Search
  CPC .... B23Q 2210/004; B23Q 2705/02–2705/068;
  B23Q 2705/023; Y10T 409/309352;
  B27C 5/026
  See application file for complete search history.

(56) References Cited

U.S. PATENT DOCUMENTS

| | | | | |
|---|---|---|---|---|
| 8,814,769 | B2* | 8/2014 | Fujioka | B23B 29/04 |
| | | | | 29/27 A |
| 2007/0227317 | A1* | 10/2007 | Asahara | B23B 3/161 |
| | | | | 82/119 |
| 2008/0231129 | A1* | 9/2008 | Kubo | F16C 32/048 |
| | | | | 310/90.5 |
| 2009/0133546 | A1* | 5/2009 | Araie | B23Q 1/0009 |
| | | | | 82/146 |
| 2010/0218652 | A1* | 9/2010 | Terai | B23B 13/08 |
| | | | | 82/146 |
| 2018/0021907 | A1* | 1/2018 | Suzuki | B23Q 5/10 |
| | | | | 173/217 |

FOREIGN PATENT DOCUMENTS

| | | |
|---|---|---|
| JP | 2004144045 A | 5/2004 |
| JP | 2005009614 A | 1/2005 |
| JP | 2007245255 A | 9/2007 |
| JP | 2008-161950 A | 7/2008 |
| JP | 2008161952 A | 7/2008 |
| WO | 2019238222 A1 | 12/2019 |

OTHER PUBLICATIONS

Written Opinion issued by the Japanese Patent Office in relation to Japanese Application No. 2018-122802 dated May 15, 2020 (1 page) along with English language translation (1 page).

Decision to Grant a Patent issued by the Japanese Patent Office in relation to Japanese Application No. 2018-122802 dated May 26, 2020 (3 pages) along with English language translation (2 pages).

* cited by examiner

SPINDLE DEVICE

CROSS-REFERENCE TO RELATED APPLICATION

This application is based upon and claims the benefit of priority from Japanese Patent Application No. 2018-122802 filed on Jun. 28, 2018, the contents of which are incorporated herein by reference.

BACKGROUND OF THE INVENTION

Field of the Invention

The present invention relates to a spindle device used in a lathe (machine tool) that machines a workpiece using a tool.

Description of the Related Art

There are cases where a spindle housing or the like for accommodating a spindle shaft is thermally deformed due to heat generated during machining on a workpiece, and such thermal deformation causes decrease in machining accuracy. It is therefore important to take countermeasures to suppress the thermal deformation.

For example, Japanese Laid-Open Patent Publication No. 2008-161950 discloses a spindle device including a housing having a spindle and a bracket having a tubular portion into which the housing is inserted. In this spindle device, flow passage openings for a fluid to be supplied to the spindle are formed on the front mounting surface of the housing attached to the bracket.

SUMMARY OF THE INVENTION

However, in the spindle device disclosed in Japanese Laid-Open Patent Publication No. 2008-161950, the housing is attached to the bracket only through the front side of the housing. For this reason, when the housing is thermally deformed, there is a concern that the relative positional relationship between the bracket and the housing changes due to the thermal deformation, which lowers machining accuracy.

In recent years, there are cases where machining on a workpiece should be controlled at nanometer levels. In such a case, even if an amount of change in the relative positional relationship between the bracket and the housing due to thermal deformation occurring during machining is very slight, decrease in machining accuracy tends to emerge. Therefore, there is a strong demand for measures to suppress the decrease in machining accuracy.

It is therefore an object of the present invention to provide a spindle device which can suppress the decrease in machining accuracy.

An aspect of the present invention resides in a spindle device including: a spindle housing; a spindle shaft configured to be rotatably supported inside the spindle housing; a spindle mount having an insertion cavity into which the spindle housing is inserted along the axial direction of the spindle shaft; a flange portion projecting outward from the outer peripheral surface of the spindle housing and configured to be removably fixed to an end of the spindle mount that is closer to one opening of the insertion cavity; and a support member configured to support the spindle housing inserted in the insertion cavity, by using, as a base, the other end of the spindle mount that is closer to the other opening of the insertion cavity.

According to the present invention, the spindle housing is fixed to the spindle mount at both ends of the spindle mount that are closer respectively to the one opening and the other opening of the insertion cavity. Therefore, the spindle housing can be firmly held to the spindle mount as compared to the case where the spindle housing is fixed to the spindle mount only at one end of the spindle mount that is closer to the one opening of the insertion cavity. With this configuration, even if the spindle housing is thermally deformed, it is possible to reduce the change in the relative positional relationship between the spindle housing and the spindle mount. As a result, it is possible to prevent a reduction in machining accuracy.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be detailed below by describing a preferred embodiment with reference to the accompanying drawings.

Embodiment

Figure 1:
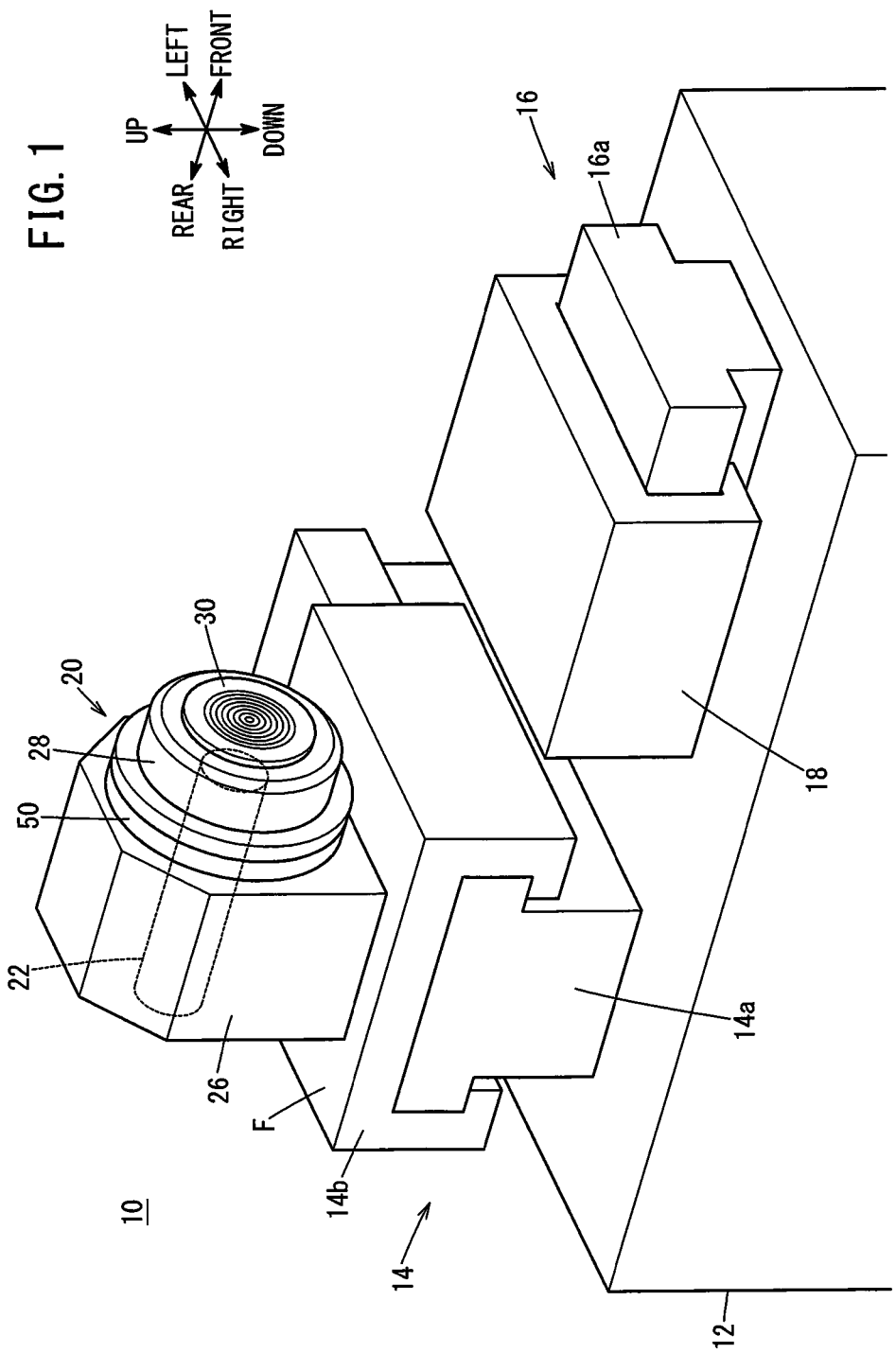
FIG. 1 is a schematic view showing a lathe according to an embodiment of the present invention.

FIG. 1 is a schematic view showing an appearance configuration of a lathe machine 10. The lathe machine 10 is used to machine a workpiece to be machined using a tool, and includes a base bed 12, a spindle support 14, a table support 16, a table 18 and a spindle device 20.

The spindle support 14 is provided on the base bed 12 to support the spindle device 20 so that it can move left and right relative to the base bed 12. Here, the direction (axial direction) in which a spindle shaft 22 of the spindle device 20 extends is referred to as the front-rear direction, the direction perpendicular to the axial direction in a plane parallel to a mounting surface F on which the spindle device 20 is mounted is referred to as the left-right direction, and the direction perpendicular to the mounting surface and the axial direction is referred to as the up-down direction. The downward direction is the direction of gravity. Further, in the spindle device 20, one end side of the spindle shaft 22 on which a chuck portion 30 is arranged is assumed to be the front side, whereas the other end side of the spindle shaft 22 is to be the rear side.

The spindle support 14 includes a first slider 14a provided along the left-right direction on the base bed 12, a spindle carriage 14b movable along the first slider 14a, and an unillustrated first drive mechanism for driving the spindle carriage 14b.

The first drive mechanism includes a motor and components such as a ball screw and others that convert the rotational motion of the motor into a linear motion. As the spindle carriage 14b is moved along the first slider 14a by the first drive mechanism, the spindle device 20 on the spindle carriage 14b is moved left and right relative to the base bed 12.

The table support 16 is arranged on the base bed 12 to movably support the table 18 in the front-rear direction with respect to the base bed 12. The table support 16 includes a second slider 16a provided along the front-rear direction on the base bed 12 and an unillustrated second drive mechanism for driving the table 18 that is movable along the second slider 16a.

The second drive mechanism includes a motor and components such as a ball screw that converts the rotational motion of the motor into a linear motion. The table 18 is moved in the front-rear direction relative to the base bed 12 through the second slider 16a by the second drive mechanism. The table 18 may be provided rotatably about a vertical axis as a rotation axis.

In the present embodiment, it is assumed that the workpiece is held by the chuck portion 30 of the spindle device 20 and the tool is held by the table 18. However, the tool may be held by the chuck portion 30 of the spindle device 20 and the workpiece may be held by the table 18.

Figure 2:
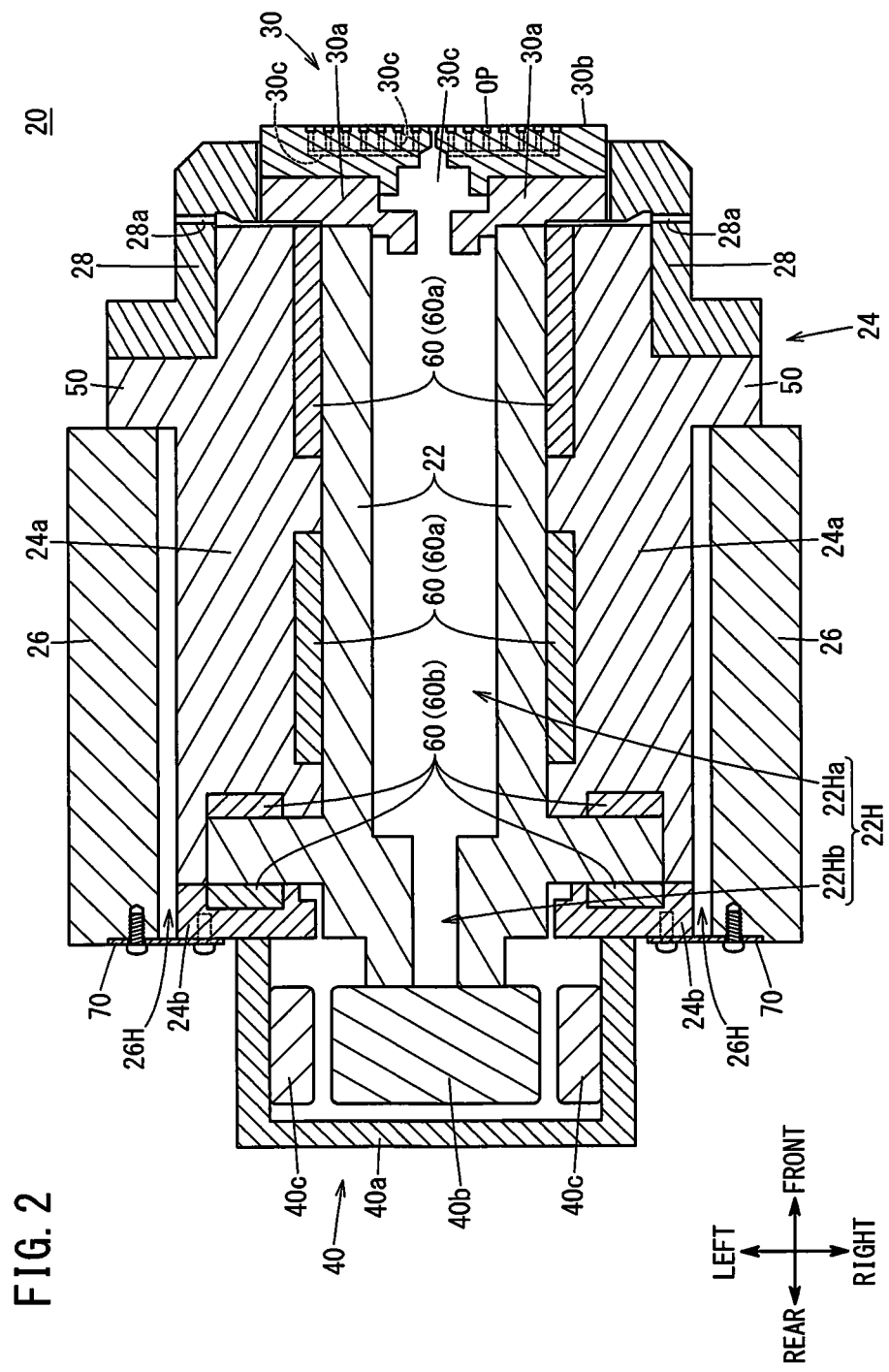
FIG. 2 is a schematic view showing a cross section of a spindle device of FIG. 1.

FIG. 2 is a schematic view showing a cross section of the spindle device 20 of FIG. 1. The spindle device 20 of the present embodiment rotatably holds a workpiece, and is used, for example, to machine the workpiece at nanometer-scale control. The spindle device 20 contains, as main components, the spindle shaft 22, a spindle housing 24, a spindle mount 26, and a cover member 28.

The spindle shaft 22 is a cylindrical member and has a cylindrical through-hole 22H penetrating in the axial direction. In the example shown in FIG. 2, the through-hole 22H has a front side through-hole 22Ha and a rear side through-hole 22Hb having a diameter smaller than that of the front side through-hole 22Ha. The chuck portion 30 is arranged on one end (front side) of the spindle shaft 22, and a motor 40 is provided on the other end (rear side).

The chuck portion 30 is a rotating member that is provided at the one end of the spindle shaft 22 so as to be turnable in conjunction with rotation of the spindle shaft 22, on the front surface of the spindle housing 24, and in the present embodiment, the chuck portion 30 holds and releases a workpiece. Here, in FIG. 1, although the chuck portion 30 is formed into a disk shape, it may have another shape. The chuck portion 30 has a base 30a fixed on the front side of the spindle shaft 22 and a suction pad 30b detachably attached to the base 30a. The suction pad 30b has openings OP formed in a suction surface thereof. The base 30a and the suction pad 30b contain therein a communication passage 30c to establish communication between the openings OP and one end of the through-hole 22H in the spindle shaft 22. In the chuck portion 30, air outside the chuck portion 30 is drawn into the through-hole 22H from the openings OP through the communication passage 30c by an unillustrated vacuum pump, to thereby keep and hold the workpiece in close contact with the suctioning face.

The motor 40 is a drive source of the spindle shaft 22 and includes a motor case 40a attached on the rear side of the spindle housing 24, and also includes a rotor 40b and a stator 40c provided inside the motor case 40a. The spindle shaft 22 is fixed to the rotor 40b. Therefore, the spindle shaft 22 rotates as the rotor 40b rotates.

The spindle housing 24 includes a substantially cylindrical housing body 24a and a rear housing lid 24b. The housing body 24a is provided with an annular flange portion 50 projecting outward from the outer peripheral surface of the housing body 24a. The flange portion 50 may be formed integrally with the housing body 24a, or may be formed as a separate body from the housing body 24a and fixed to the housing body 24a by predetermined fasteners.

The rear housing lid 24b is removably attached on the rear side of the housing body 24a so as to cover the opening on the rear of the housing body 24a. The motor case 40a of the motor 40 is fixed to the outer (rear endface) side of the rear housing lid 24b.

A substantially cylindrical space for shaft arrangement is defined by the rear housing lid 24b and the housing body 24a so as to extend therethrough in the front-rear direction. The spindle shaft 22 is arranged in the shaft arrangement space, and the spindle shaft 22 arranged in the shaft arrangement space is rotatably supported by bearings 60.

The bearings 60 include thrust bearings 60a and radial bearings 60b in this embodiment. The thrust bearings 60a are arranged on the left and right sides of the spindle shaft 22. The radial bearings 60b are provided on the front and rear sides of a rear portion of the spindle shaft 22 that is located at the rear of the thrust bearings 60a. The bearing 60 may be a hydrostatic bearing or a rolling bearing. In the case where the machining on the workpiece should be controlled on a nanometer-scale as mentioned above, use of a hydrostatic bearing is preferable.

The spindle mount 26 is placed on the mounting surface F (FIG. 1) of the spindle carriage 14b. The spindle mount 26 has an insertion cavity 26H into which the spindle housing 24 is inserted along the axial direction of the spindle shaft 22. The front side of the spindle housing 24 inserted into the insertion cavity 26H is fixed to the front side of the spindle mount 26 by the flange portion 50 provided on the housing body 24a, and the rear side of the spindle housing 24 is supported by a support member 70 provided on the rear side of the spindle mount 26.

Specifically, the flange portion 50 is detachably fixed to the front side (one end that is closer to one opening of the insertion cavity 26H) of the spindle mount 26 by rod-shaped fasteners such as bolts. On the other hand, the support member 70 supports the spindle housing 24 by using, as a base, the rear side (the other end that is closer to the other opening of the insertion cavity 26H) of the spindle mount 26.

That is, the spindle housing 24 is supported on the spindle mount 26 at two ends, i.e., at front and rear of the spindle housing 24. Therefore, the spindle device 20 according to this embodiment can hold the spindle housing 24 more firmly than in the case where the spindle housing 24 is supported (cantilevered) only at the front side thereof on the spindle mount 26.

The cover member 28 is provided to cover the surface on front side of the flange portion 50, the outer peripheral surface of the housing body 24a extending forward from the flange surface and part of the outer peripheral surface of the chuck portion 30. Although the cover member 28 covers part of the outer peripheral surface of the chuck portion 30, it may be arranged so as to cover either the whole of the outer peripheral surface or at least a part of the outer peripheral surface of the chuck portion 30.

The cover member 28 has, formed therein, a gas flow passage 28a for flowing a gas in order to seal a portion to be sealed (also referred to as a sealed portion). The sealed portion is a gap between the chuck portion 30 and the cover member 28 and a gap between the chuck portion 30 and the housing body 24a. The gas may be compressed to a predetermined pressure. Specific examples of the gas include air. By supplying the seal gas to the sealed portion, it is possible to prevent chips generated during machining of the workpiece, coolant used at the time of machining, etc., from entering the interior (shaft arrangement space) of the spindle housing 24 through the gaps. The seal gas flowing into the sealed portion is discharged from the front side of the spindle device 20 and others to the outside.

Further, an unillustrated coolant flow passage for flowing the coolant is formed in the cover member 28, so that the coolant flowing through the coolant flow path adjusts the temperature of the cover member 28. The coolant includes, for example, water or compressed air.

Figure 3:
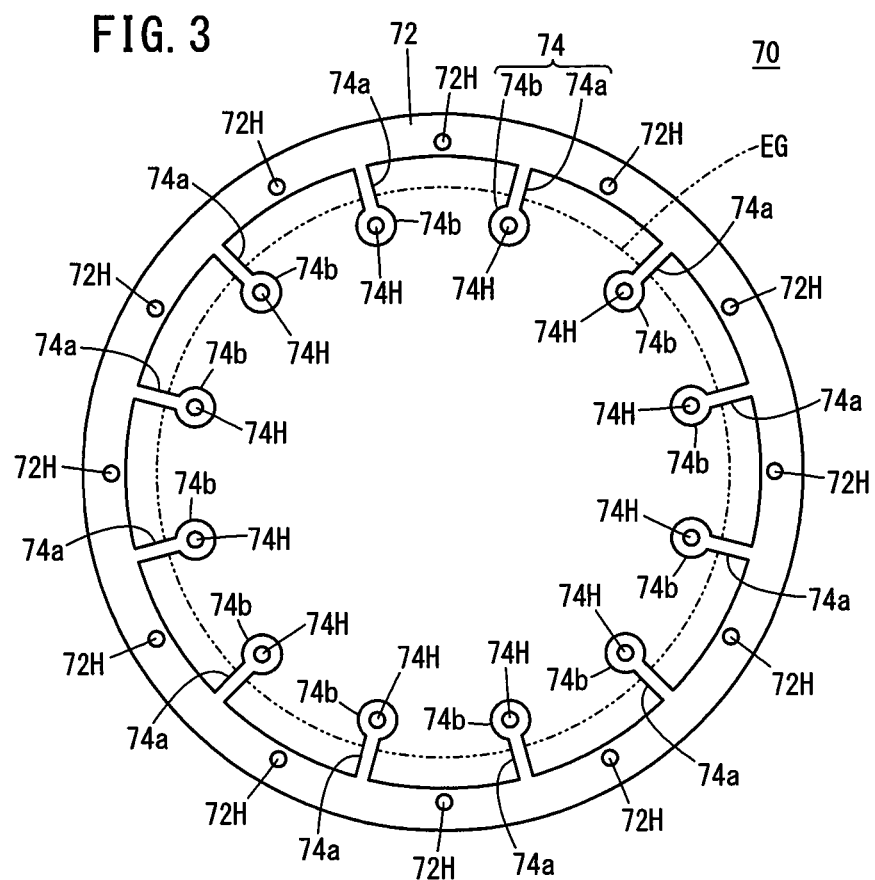
FIG. 3 is a view showing a support member of FIG. 1.
Figure 4:
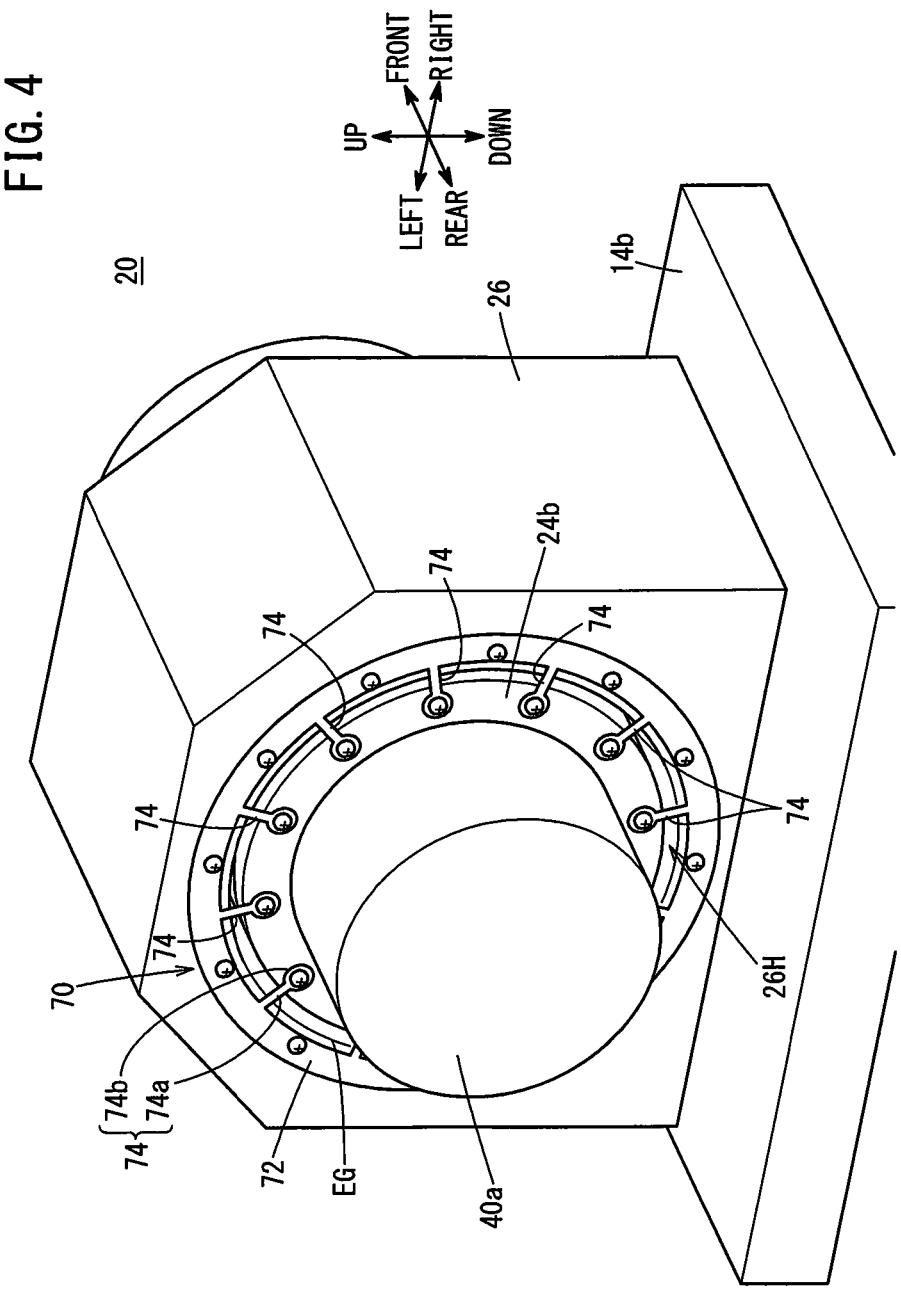
FIG. 4 is a schematic view showing a state where the support member of FIG. 3 is attached.

FIG. 3 is a view showing the support member 70. FIG. 4 is a schematic view showing the support member 70 when attached. The support member 70 has a support base 72 and a plurality of support arms 74. The support base 72 is disposed around the rear opening of the insertion cavity 26H in the spindle mount 26.

The support base 72 is formed into a ring shape. The ring shape is not limited to a circular shape illustrated in the drawings, and may be a shape other than the circular shape. Further, the ring may have an unconnected point like a Landolt ring, or may have multiple unconnected points intermittently. That is, as long as the annular support base 72 extends in a ring-like shape, the annular support base may contain an unconnected point.

The support base 72 has a plurality of through-holes 72H formed therein at intervals along the circumferential direction thereof. Rod-shaped fasteners such as screws are inserted through the through-holes. The rod-shaped fasteners are inserted through the respective through-holes 72H to thereby fix the support base 72 to a portion of the spindle mount 26 that lies around the rear opening of the insertion cavity 26H.

The multiple support arms 74 are arranged at intervals in the circumferential direction of the spindle shaft 22. The intervals between the adjacent support arms 74 are approximately equal to each other in the present embodiment. Each of the support arms 74 has an arm body 74a and an arm attachment 74b, and has elasticity. The arm body 74a is formed into, for example, a strip shape, and extends along the radial direction of the spindle shaft 22 so as to cross the edge EG of the rear opening of the insertion cavity 26H in the spindle mount 26.

The arm attachment 74b is disposed on the surface (rear endface) of the rear housing lid 24b, and more specifically, located outside the motor case 40a fixed to the surface (rear endface) of the rear housing lid 24b, and has a through-hole 74H. The arm attachment 74b is formed into an annular shape. The annular shape is not limited to the circular shape illustrated in the drawings, and may be a shape other than the circular shape. Further, the annular shape may have an unconnected point like a Landolt ring, or may have multiple unconnected points intermittently. That is, as long as the annular arm attachment 74b is given in a ring-like shape, the annular arm attachment may contain an unconnected portion.

A rod-shaped fastener such as a screw is inserted into each of the annular arm attachments 74b, whereby fixing to the surface (rear endface) of the rear housing lid 24b of the spindle housing 24 is performed.

In this embodiment, the annular arm attachment 74b is located at a position on a line on which the support arm 74 (arm body 74a) extends, and the through-hole 72H of the support base 72 is offset in the circumferential direction of the spindle shaft 22 with respect to the line on which the support arm extends. That is, the arm attachments 74b, which are the fixed positions on the spindle housing 24 side, and the through-holes 72H, which are the fixed positions on the spindle mount 26 side, are arranged along the circumferential direction of the spindle shaft 22 alternately on the inside and the outside of the edge EG of the rear opening of the insertion cavity 26H in the spindle mount 26 (in a staggered manner).

The multiple support arms 74 thus provided makes it possible to suppress thermal deformation of the spindle housing 24 attached to the spindle mount 26 in the radial direction of the spindle shaft 22. Further, even if a dimensional error is caused in the radial direction of the spindle shaft 22 between the spindle mount 26 and the flange portion 50, due to variation in dimension and the like, it is possible to suppress the dimensional errors from becoming large. Therefore, in the spindle device 20 of the present embodiment, it is possible to suppress misalignment (off-centering) of the spindle shaft 22 (displacement of the axial position of the spindle shaft 22 in the radial direction).

Further, in the present embodiment, each of the multiple support arms 74 has elasticity in the axial direction of the spindle shaft 22. Therefore, deformation of the spindle housing 24 in the radial direction of the spindle shaft 22, caused by excessive restraint of the thermal deformation and dimensional errors arising in the axial direction of the spindle shaft 22, can be suppressed.

That is, deformation of the spindle housing 24 in the radial direction of the spindle shaft 22 is suppressed by the multiple support arms 74 while deformation of the spindle housing 24 in the axial direction of the spindle shaft 22 is appropriately tolerated by the elasticity of the support arms 74. Therefore, in the spindle device 20 of the present embodiment, it is possible to enhance the rigidity of the spindle housing 24 in the radial direction of the spindle shaft 22 and increase the flexibility of the spindle housing 24 in the axial direction of the spindle shaft 22.

In addition, the support arm 74 has the annular arm attachment 74b connected to an end portion of the support arm that is located inside the edge EG of the rear opening of the insertion cavity 26H in the spindle mount 26. As a result, it is possible to avoid attaching the support arm 74 to the spindle housing 24 by inserting the rod-shaped fastener through the arm body 74a of the support arm 74. Therefore, in the spindle device 20 of this embodiment, it is easy to ensure stable rigidity and flexibility in the support arm 74.

Further, in the present embodiment, the arm body 74a of each support arm 74 is smaller than the outer shape of the annular arm attachment 74b. That is, in each support arm 74 the arm body 74a is formed as a constricted portion CP relative to the annular arm attachment 74b at the distal end. Therefore, in the spindle device 20 according to the present embodiment, as compared with the case where the above-described constricted portion CP is not provided, it is possible to appropriately permit deformation in the axial direction of the spindle shaft 22 and improve flexibility.

Further, in the present embodiment, the arm attachment 74b, through which the support member 70 is fixed to the spindle housing 24, is located on a line on which the arm body 74a extends. Additionally, the through-hole 72H of the support member 70, through which the support member 70 is fixed to the spindle mount 26, is offset in the circumferential direction of the spindle shaft 22 from the line on which the arm body 74a extends. For this reason, the elasticity of the support arm 74 is easily enhanced and the force applied to the support arm 74 is easier to disperse, as compared to the case where both the arm attachment 74b and the through-hole 72H are arranged on a line on which the arm body 74a extends. Therefore, in the spindle device 20 of the present embodiment, it is easy to secure the flexibility while improving the durability of the support arm 74.

MODIFICATIONS

Though the above embodiment has been described as one example of the present invention, the technical scope of the invention should not be limited to the above embodiment. It goes without saying that various modifications and improvements can be added to the above embodiment. It is also apparent from the scope of the claims that embodiments added with such modifications and improvements should be incorporated in the technical scope of the invention. Examples in which the above embodiment is modified or improved will be described below.

Modification 1

Figure 5:
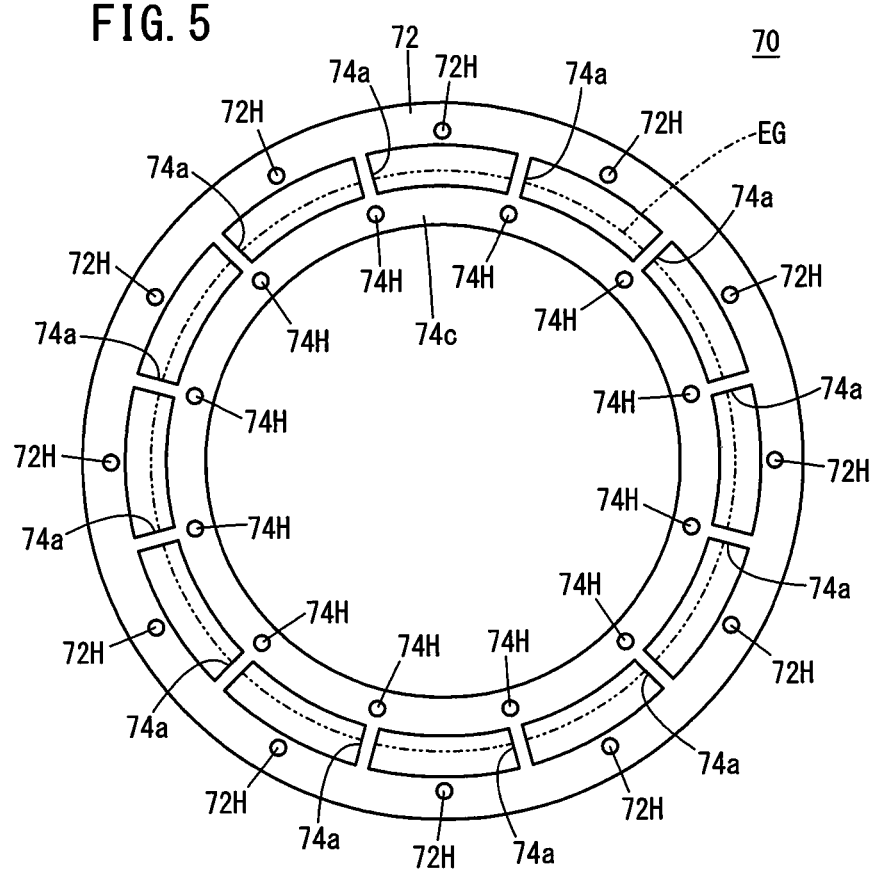
FIG. 5 is a view showing a support member of Modification 1.

FIG. 5 is a view showing a support member 70 of Modification 1. The support member 70 of Modification 1 has an arm attachment 74c having a shape different from that of the arm attachment 74b of the above embodiment. The arm attachment 74c is connected to an end of each of multiple support arms 74 (arm bodies 74a), and is formed into an annular shape. Specifically, this end is located at a position inside the edge EG of the rear opening of the insertion cavity 26H in the spindle mount 26.

The annular shape is not limited to the circular shape illustrated in the drawings, and may be a shape other than the circular shape. Further, the annular portion or ring may have an unconnected point like a Landolt ring, or may have multiple unconnected points intermittently. That is, as long as the annular arm attachment 74c is given, overall, in the form of a ring as described above, the annular arm attachment may contain an unconnected point.

The annular arm attachment 74c is sized such that the spindle housing 24 that is set inside the insertion cavity 26H of the spindle mount 26 and projects therefrom can be inserted through the annular arm attachment (see FIG. 4). In the annular arm attachment 74c, a plurality of through-holes 74H, through which respective rod-shaped fasteners such as screws are inserted, are formed at intervals along the circumferential direction of the annular arm attachment 74c. Each through-hole 74H is located on a line on which an arm body 74a extends.

This arm attachment 74c contacts the spindle housing 24 on an area greater than the arm attachments 74b of the embodiment. Therefore, according to the support member 70 of Modification 1, it is easy to secure more stable rigidity and flexibility than that of the support member 70 of the above embodiment.

In this example, the positional relationship between the through-hole 74H through which the support member 70 is fixed to the spindle housing 24 and the through-hole 72H through which the support member 70 is fixed to the spindle mount 26 may be reversed. That is, the through-hole 72H of the support base 72 is positioned on a line on which the arm body 74a extends, and the through-hole 74H of the support arm 74 is offset in the circumferential direction of the spindle shaft 22 relative to the line on which the arm body 74a extends.

Also with this positional relationship, the through-holes 74H which are the fixed positions of the support member to the spindle housing 24 and the through-holes 72H which are the fixed positions of the support member to the spindle mount 26, are arranged along the circumferential direction of the spindle shaft 22 alternately on the outer side and the inner side of the edge EG of the rear opening of the insertion cavity 26H in the spindle mount 26, i.e., arranged in a staggered manner. Therefore, as in the above embodiment, it is easy to secure flexibility while improving the durability of the support arm 74.

Modification 2

Figure 6:
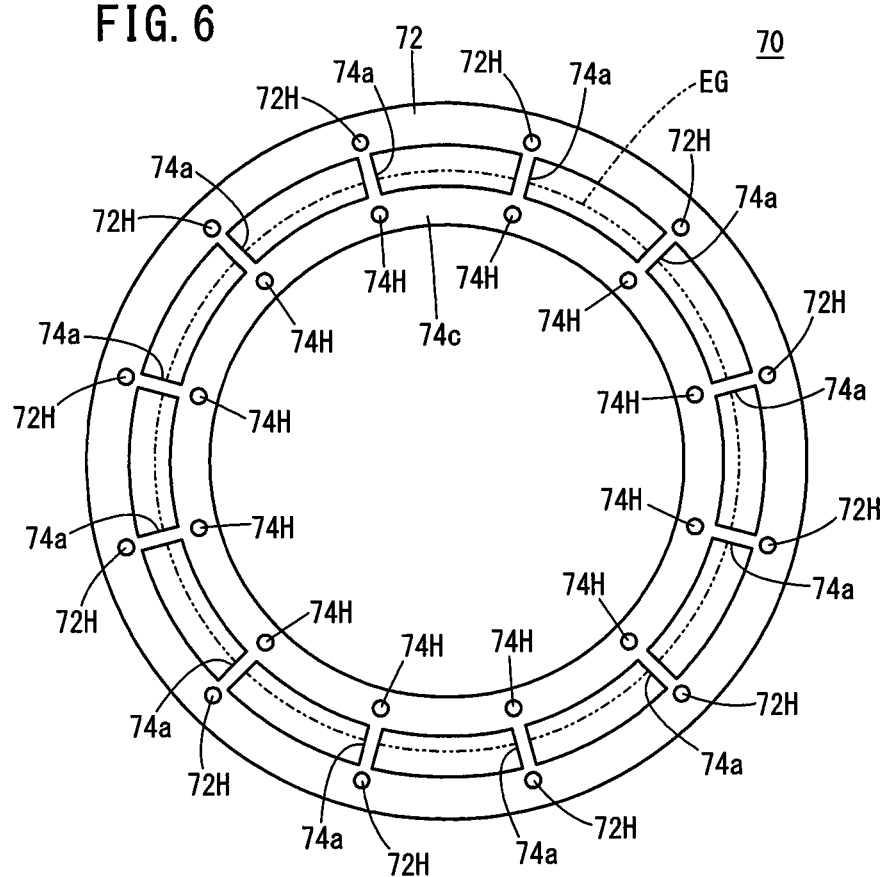
FIG. 6 is a view showing a support member of Modification 2.

FIG. 6 is a view showing a support member 70 of Modification 2. The support member 70 of Modification 2 is obtained by changing the position of the through-hole 72H formed in the support base 72 of the support member 70 of Modification 1. That is, the through-hole 72H is positioned on a line on which the arm body 74a extends. That is, both the through-hole 72H through which the support member 70 is fixed in position to the spindle mount 26 and the through-hole 74H through which the support member 70 is fixed to the spindle housing 24 are aligned in the extending direction of the arm body 74a, i.e., located on a line on which the arm body 74a extends.

Also in this case, the rigidity and flexibility of the support arm 74 can be secured as in the above embodiment. The through-hole 72H of the support base 72 in the support member 70 of the above embodiment may be positioned on a line on which the arm body 74a extends.

However, when the fixed position on the spindle mount 26 side and the fixed position on the spindle housing 24 side are aligned in the direction of extension of the arm body 74a, the elasticity of the support arm 74 is difficult to increase, hence the force applied to support arm 74 is difficult to disperse. Therefore, in order to make it easy to secure flexibility while enhancing the durability of the support arm 74, use of the support member 70 of the above-described embodiment or Modification 1 is preferable.

Modification 3

Figure 7:
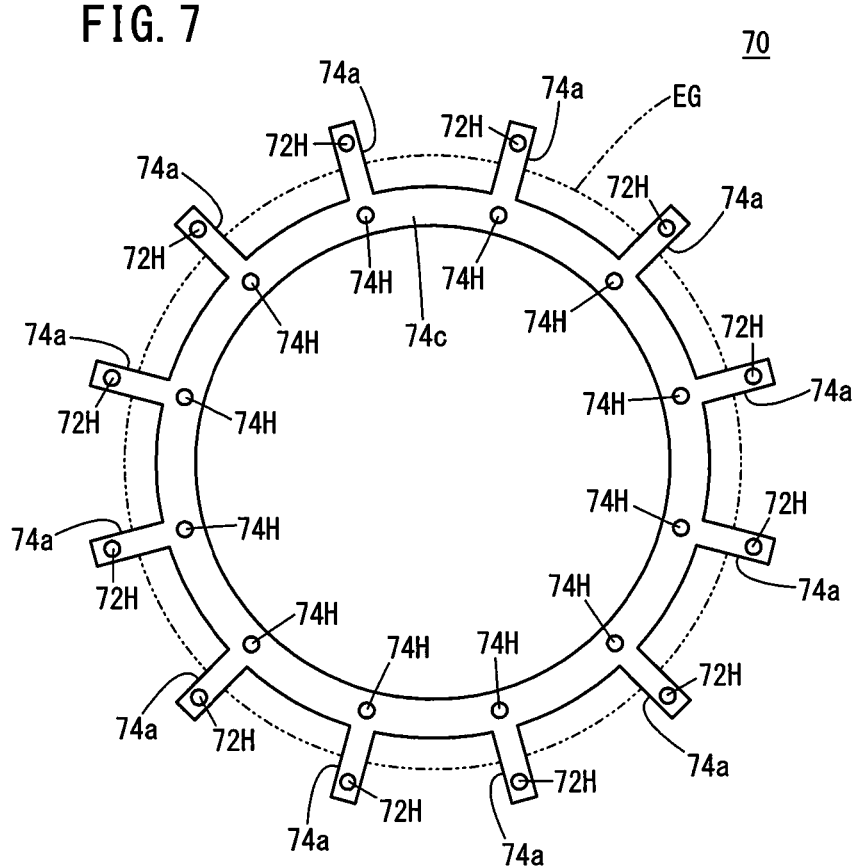
FIG. 7 is a view showing a support member of Modification 3.

FIG. 7 is a view showing a support member 70 of Modification 3. In the support member 70 of Modification 3, the support base 72 of the embodiment is omitted while an arm attachment 74c of Modification 1 is employed instead of the arm attachments 74b of the embodiment.

In the support member 70 of Modification 3, the support base 72 is eliminated, so a plurality of through-holes 72H, each allowing a rod-shaped fastener such as a screw to be inserted, are formed at respective ends of the arm bodies 74a. The end is a portion that extends radially outward and lies outside the edge EG of the rear opening of the insertion cavity 26H in the spindle mount 26. In addition, the arm attachment 74b may be formed in this end. Also in this case, the rigidity and flexibility of the support arm 74 can be secured, similarly to the above embodiment.

However, since the through-hole 72H is formed in the arm body 74a, the rigidity and the flexibility of the support arm 74 become lower as compared to the case where the through-hole 72H is not formed in the arm body. Therefore, in order to further increase the rigidity and flexibility of the support arm 74, use of the support member 70 of the above embodiment, Modification 1 or Modification 2 is preferable.

Modification 4

In this modification, the support member 70 of the above embodiment may have neither the support base 72 nor the arm attachment 74b of the support arm 74. When the support base 72 and the arm attachment 74b are both omitted, through-holes into which rod-shaped fasteners such as screws are inserted are provided at respective both ends of the arm body 74a. However, in order to avoid provision of the through-hole in the arm body 74a, it is preferable that the support base 72 and the arm attachment 74b are provided.

Modification 5

In the above-described embodiment, the multiple support arms 74 are arranged at equal intervals in the circumferential direction of the spindle shaft 22. However, the intervals at which the support arms 74 are arranged may not be the same. For example, the intervals at which the support arms 74 are arranged may be different between one side (upper side) and the other side (lower side) defined by a horizontal plane (which serves as a boundary) including the axis of the spindle shaft 22, or between one side (left side) and the other side (right side) defined by the vertical plane (which serves as a boundary) perpendicular to the horizontal plane and including the axis of the spindle shaft.

By thus varying the intervals of the support arms 74, it is possible to change the rigidity and the flexibility between one side and the other side with respect to the horizontal or vertical plane. The horizontal plane including the axis of the spindle shaft 22 is a plane parallel to the mounting surface F on which the spindle mount 26 is set and including the axis of the spindle shaft 22, and the plane orthogonal to this plane is the vertical plane.

Modification 6

In the above embodiment, each of the multiple support arms 74 has the constricted portion CP. However, all or part of the multiple support arms 74 may not have the constricted portion CP. That is, all or part of the support arms 74 of the multiple support arms 74 may be formed to have a width substantially equal to the outer diameter of the annular arm attachment 74b or a width greater than the outer diameter of the annular arm attachment 74b.

Nevertheless, it is preferable that each of the multiple support arms 74 have the constricted portion CP in order to appropriately allow thermal deformation arising in the axial direction of the spindle shaft 22 and to enhance flexibility. In the above configurations, the arm body 74a of the support arm 74 is given in a strip shape so that the arm body 74a has a constant width along the longitudinal direction of the arm body 74a. However, the arm body 74a may be varied in width so as to have a wavy shape or any other shape not having a constant width.

Finally, the embodiment and Modifications may be combined arbitrarily as long as no technical inconsistency occurs.

Technical Ideas

Technical ideas that can be grasped from the above-described embodiment and Modifications will be described below.

The spindle device (20) includes: a spindle housing (24), a spindle shaft (22), a spindle mount (26), a flange portion (50), and a support member (70).

The spindle shaft (22) is rotatably supported inside the spindle housing (24). The spindle mount (26) has an insertion cavity (26H) into which the spindle housing (24) is inserted along the axial direction of the spindle shaft (22). The flange portion (50) projects outward from the outer peripheral surface of the spindle housing (24) and is removably fixed to an end of the spindle mount (26) that is closer to one opening of the insertion cavity (26H). The support member (70) is configured to support the spindle housing (24) inserted in the insertion cavity (26H), by using, as a base, the other end of the spindle mount (26) that is closer to the other opening of the insertion cavity (26H).

In the thus configured spindle device (20), the spindle housing (24) is fixed to the spindle mount (26) at both ends of the spindle mount (26) that are closer respectively to the one opening and the other opening of the insertion cavity (26H). Therefore, the spindle housing (24) can be held more firmly than in the case where the spindle housing (24) is fixed to the spindle mount (26) only at one end of the spindle mount (26) that is closer to the one opening of the insertion cavity (26H).

With the above configuration, even if the spindle housing (24) is thermally deformed, it is possible to reduce the change in the relative positional relationship between the spindle housing (24) and the spindle mount (26), and hence prevent lowering of machining accuracy.

The support member (70) may include a plurality of support arms (74) which are arranged at intervals in the circumferential direction of the spindle shaft (22), each of the support arms extending in the radial direction of the spindle shaft (22) so as to cross the edge (EG) of the other opening of the insertion cavity (26H).

This configuration enables the multiple support arms (74) to suppress thermal deformation and dimensional errors that occur in the spindle housing (24) in the radial direction of the spindle shaft (22). Therefore, misalignment or off-centering of the spindle shaft (22) (displacement of the axis of the spindle shaft (22) in the radial direction) can be suppressed.

Each of the multiple support arms (74) may have elasticity in the axial direction.

This configuration enables the multiple support arms (74) to suppress thermal deformation and dimensional errors of the spindle housing (24) in the radial direction of the spindle shaft (22) while enhancing the rigidity. Further, the elasticity of the support arms (74) can appropriately allow thermal deformation and dimensional errors of the spindle housing (24) in the axial direction of the spindle shaft (22) and accordingly enhance flexibility.

The support member (70) may include an annular support base (72) to which ends of the multiple support arms (74) that extend outward of the edge (EG) are connected, and the annular support base may be arranged around the other opening of the insertion cavity (26H) so as to be able to be fixed to the spindle mount (26).

This makes it possible to increase the contact area with the spindle mount (26) as compared to the case with no support base (72). Therefore, rigidity and flexibility of the support arms (74) can be further enhanced.

Each of the multiple support arms (74) may include an annular arm attachment (74b) that is connected to an end of the support arm (74) that extends inward of the edge (EG) so as to be able to be fixed to the spindle housing (24).

This configuration enables the support arms (74) to be fixed one by one to the spindle housing (24).

At least one of the multiple support arms (74) may have a constricted portion (CP) relative to the annular arm attachment (74b).

This configuration makes it possible to appropriately permit thermal deformation and positional errors arising in the axial direction of the spindle shaft (22) and accordingly enhance flexibility, as compared to the case where no constricted portion (CP) is provided.

The multiple support arms (74) may be provided with an annular arm attachment (74c) which is connected to ends of the multiple support arms (74) that extend inward of the edge (EG), the annular arm attachment being configured to allow insertion of the spindle housing (24).

This makes it possible to increase the contact area with the spindle housing (24) as compared to the case with no arm attachment (74c). Therefore, rigidity and flexibility of the support arms (74) can be easily enhanced.

The spindle device may be configured such that the support member (70) is fixed to the spindle mount (26) through first positions of the support member and is fixed to the spindle housing (24) through second positions of the support member, and one of the first position and the second position is arranged at a position on a line on which the support arm (74) extends while the other position is arranged at a position offset in the circumferential direction of the spindle shaft (22), relative to the line on which the support arm extends.

With this configuration, it is possible to enhance the elasticity of the support arm (74) more easily than when both the first position and the second position are located on the line on which the support arm (74) extends, as well as dispersing the force acting on the support arm (74) more easily. Therefore, it is possible to easily increase flexibility while enhancing the durability of the support arm (74).

The spindle device may be configured such that the intervals at which the support arms (74) are arranged are different between one side and the other side that are defined by a plane parallel to a mounting surface (F) on which the spindle mount (26) is set and including the axis of the spindle shaft (22).

This configuration makes it possible to change the rigidity and flexibility of the support arms (74) between one side and the other side.

The spindle device may be configured such that the intervals at which the support arms (74) are arranged are different between one side and the other side that are defined by a plane perpendicular to a plane parallel to a mounting surface (F) on which the spindle mount (26) is set and including the axis of the spindle shaft (22).

This configuration makes it possible to change the rigidity and flexibility of the support arms (74) between one side and the other side.

What is claimed is:

1. A spindle device comprising:
   a spindle housing;
   a spindle shaft configured to be rotatably supported inside the spindle housing;
   a spindle mount having an insertion cavity into which the spindle housing is inserted along an axial direction of the spindle shaft;
   a flange portion projecting outward from an outer peripheral surface of the spindle housing and configured to be removably fixed to an end of the spindle mount that is closer to one opening of the insertion cavity; and
   a support member configured to support the spindle housing inserted in the insertion cavity, by using, as a base, another end of the spindle mount that is closer to another opening of the insertion cavity,
   wherein the support member includes a plurality of support arms which are arranged at intervals in a circumferential direction of the spindle shaft, each of the support arms extending in a radial direction of the spindle shaft so as to cross an edge of the other opening of the insertion cavity.

2. The spindle device according to claim 1, wherein each of the plurality of support arms has elasticity in the axial direction.

3. The spindle device according to claim 1, wherein the support member comprises an annular support base to which ends of the plurality of support arms that extend outward of the edge are connected, and the annular support base is arranged around the other opening of the insertion cavity so as to be able to be fixed to the spindle mount.

4. The spindle device according to claim 1, wherein each of the plurality of support arms comprises an annular arm attachment that is connected to an end of the support arm that extends inward of the edge so as to be fixable to the spindle housing.

5. The spindle device according to claim 4, wherein at least one of the support arms has a constricted portion relative to the annular arm attachment.

6. The spindle device according to claim 1, wherein the plurality of support arms are provided with an annular arm attachment which is connected to ends of the plurality of support arms that extend inward of the edge, the annular arm attachment being configured to allow insertion of the spindle housing.

7. The spindle device according to claim 1, wherein the support member is fixed to the spindle mount through first positions of the support member and is fixed to the spindle housing through second positions of the support member, and one of the first position and the second position is arranged at a position on a line on which the support atm extends while another one of the first position and the second position is arranged at a position offset in the circumferential direction of the spindle shaft, relative to the line on which the support arm extends.

8. The spindle device according to claim 1, wherein the intervals at which the support arms are arranged are different between one side and another side that are defined by a plane parallel to a mounting surface on which the spindle mount is set and including an axis of the spindle shaft.

9. The spindle device according to claim 1, wherein the intervals at which the support arms are arranged are different between one side and another side that are defined by a plane perpendicular to a plane parallel to a mounting surface on which the spindle mount is set and including an axis of the spindle shaft.

* * * * *